(12) United States Patent
Hayes et al.

(10) Patent No.: US 6,501,473 B1
(45) Date of Patent: Dec. 31, 2002

(54) METHOD AND SYSTEM FOR THEORY OF CONSTRAINTS BUFFER GRAPHING, TRACKING AND MANAGEMENT

(75) Inventors: Todd R. Hayes, Bernardsville, NJ (US); Ed van Loenen, Haarlem (NL); Michael W. Andrews, Maplewood, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/271,728

(22) Filed: Mar. 18, 1999

(51) Int. Cl.[7] .............................................. G06T 11/20
(52) U.S. Cl. ...................................... 345/440; 345/963
(58) Field of Search ................................ 345/440, 133, 345/131; 705/10, 7, 8, 9; 707/103; 703/1; 700/90, 100

(56) References Cited

U.S. PATENT DOCUMENTS

| | | | | |
|---|---|---|---|---|
| 5,627,973 A | * | 5/1997 | Armstrong et al. ............ | 705/10 |
| 5,659,768 A | * | 8/1997 | Forbes et al. ................. | 345/440 |
| 5,874,965 A | * | 2/1999 | Takai et al. .................. | 345/963 |
| 5,893,074 A | * | 4/1999 | Hughes et al. ................. | 705/8 |
| 5,907,490 A | * | 5/1999 | Oliver .......................... | 700/90 |
| 5,974,391 A | * | 10/1999 | Hongawa ........................ | 705/7 |
| 5,993,041 A | * | 11/1999 | Toba ........................... | 700/100 |
| 6,008,817 A | * | 12/1999 | Gilmore ........................ | 345/440 |
| 6,023,702 A | * | 2/2000 | Leisten et al. ................ | 707/100 |
| 6,101,481 A | * | 8/2000 | Miller ............................ | 705/9 |
| 6,216,109 B1 | * | 4/2001 | Zweben et al. ................. | 705/8 |
| 6,240,395 B1 | * | 5/2001 | Kumashiro ..................... | 705/7 |
| 6,282,514 B1 | * | 8/2001 | Kumashiro ..................... | 705/7 |

* cited by examiner

*Primary Examiner*—Matthew Luu
*Assistant Examiner*—Chante' Harrison

(57) ABSTRACT

A graphical method and system of tracking projects managed in accordance with Theory of Constraints project management techniques. A graph of project and feeding chain buffer consumption is constructed for at a glance project status review by management. Alternate buffer consumption models may be utilized.

12 Claims, 9 Drawing Sheets

FIG. 10A
(PRIOR ART)

| Task ID | Buffer Name | Buffer Name | Buffer Length | % Buffer Used | Buffer Left | Chain Left | Check Task |
|---|---|---|---|---|---|---|---|
| 12 | PB\|T3 TCP/IP Interworking [22.3.3]-6313 | 6/23/98 | 9d | 100% | 0d | 40d | T4 ONU Management [23.5.4]-6315 |
| 17 | PB\|T4 MAP layer-Oki (SW) [23.5.3]-6305 | 5/21/98 | 7d | 100% | 0d | 15d | T4 MAC layer-non-Oki (HW) [23.3.7]-6304 |
| 188 | PB\|**Parts list, pinout and footprint to Co-6193 | 7/22/98 | 28d | 100% | 0d | 18d | Design-6214 |
| 197 | PB\|**ONU XCVR (metal pkg ICs) available for-7458 | 10/13/98 | 34d | 100% | 0d | 70d | Design-6214 |
| 199 | PB\|Integration and Unit test with plastic p-6220 | 10/29/98 | 36d | 100% | 0d | 80d | Design-6214 |
| 470 | PB\|D&M verification-6812 | 7/22/98 | 16d | 100% | 0d | 30d | D&M coding-6811 |
| 484 | PB\|75% Stocklist complete-7168 | 4/30/98 | 5d | 100% | 0d | 3d | 75% Stocklist complete-7166 |
| 495 | FB\|HZ OSU XCVR Unit test (w/o CDR)-6707\|OSU XCVR | 8/14/98 | 17d | 100% | 0d | 70d | OSU XCVR Schematic design; Order |
| 530 | PB\|**NJ OSU XCVR to OSU-Em or | 10/13/98 | 32d | 100% | 0d | 105d | **NJ OSU XCVR to OSU-Em or |
| 566 | PB\|Design documentation, EM-02-7175 | 4/29/98 | 5d | 100% | 0d | 15d | Design documentation, EM-02-7175 |
| 641 | PB\|hardware with messages [OUTPUT LINK?]-7203 | 8/6/98 | 43d | 100% | | 20d | hardware (Ranging)-7202 |
| 896 | PB\|HLD4 Preparation-7324 | 10/13/98 | 25d | 100% | | 7d | HLD4 Preparation (stubs & drivers)-7324 |

FIG. 10B
(PRIOR ART)

| ID | Description | Date | Duration | % | | | Description |
|---|---|---|---|---|---|---|---|
| 944 | FB\|*HLD3 available *-6916\|int4: Complete ONU | 11/9/98 | 60d | 100% | 0d | 5d | *HLD3 (incl bootstrap) available *-6916 |
| 950 | FB\|*P1 ATM-25 UNI available*-6477\|int4: | 11/16/98 | 69d | 100% | 0d | 8d | *P1 ATM-25 UNI available *-6477 |
| 952 | FB\|*Pass0 OSU-Em available*-5768\|int4: | 11/9/98 | 64d | 100% | 0d | 1d | *Pass0 OSU-Em available*-5768 |
| 957 | PB\|**Delivery ES1:P1 ONU and ATM25 tested-7334 | 12/28/98 | 36d | 100% | 0d | 40d | Int4: Complete ONU Integration-8071 |
| 971 | FB\|*Core Card AM1 available*-8456\|int5: Full | 1/5/99 | 52d | 100% | 0d | 57d | *Core Card AM1 available*-8456 |
| 968 | PB\|*Delivery ES1 with Full Functionality*-5841 | 1/25/99 | 37d | 100% | 0d | 55d | *Delivery ES1: ONU+ATM25 to joint |
| 1015 | FB\|*Testplan int7b available*-8228\|int7b | 1/5/99 | 48d | 100% | 0d | 32d | Review draft Testplan-8385 |
| 1018 | FB\|*P1 ATM-45 Card available-6478\|int7a: | 12/15/98 | 70d | 100% | 0d | 26d | *P1 ATM-45 Card available*-6478 |
| 1028 | PB\|**Delivery ES2 with FF (P1 ATM45 UNIs) t-7359 | 1/25/99 | 38d | 100% | 0d | 55d | Int7b: ATM-45 UNI Integration-6974 |
| 1060 | FB\|*Feedback from ATM-PON ONU XCVR | 9/1/98 | 16d | 100% | 0d | 10d | *Feedback from ATM-PON ONU XCVR |
| 1114 | FB\|Manufacture and delivery of PCB-7130\|MLR and | 12/29/98 | 7d | 100% | 0d | 112d | OSU XCVR P2 Design, Entry, Review-6577 |
| 1116 | FB\|Vintage-7131\|MLR and Assembly-7132 | 12/29/98 | 7d | 100% | 0d | 112d | OSU XCVR P2 Design, Entry, Review-6577 |
| 1118 | FB\|*P2 CDR ASIC available*-7377\|MLR and | 12/29/98 | 11d | 100% | 0d | 125d | *P2 CDR ASIC available*-7377 |

METHOD AND SYSTEM FOR THEORY OF CONSTRAINTS BUFFER GRAPHING, TRACKING AND MANAGEMENT

FIELD OF THE INVENTION

The present invention relates to the field of project management and scheduling techniques. In particular, the present invention concerns a novel approach to Theory of Constraints (TOC) buffer graphing, tracking and the management of projects in accordance with TOC techniques.

BACKGROUND OF THE INVENTION

Various techniques have been used for the management of project scheduling. One of the techniques used to manage such project scheduling is, for example, (Program Evaluation and Review Technique (PERT) chart techniques. PERT chart techniques have been used quite extensively in the management of project scheduling. The PERT technique uses a well known critical path method.

Another technique that has been used for project scheduling and tracking is the Theory of Constraints (TOC). This technique, which is a relatively new approach, is described in detail in the book "Critical Chain," by Eliyahu Goldratt (The North River Press, Great Barrington, Mass. 1997). Some of the key principles of the TOC include the focusing of attention on the critical chain (that chain of events and staff that most determines the delivery interval), eliminating multi-tasking of individuals when building and implementing schedules, and the managing of progress via intervals rather than dates.

In particular, TOC schedules are created by estimating 50% confidence intervals for the individual development tasks of the complete project, i.e. 50% probability of completing the individual task, and then linking them together to create an overall schedule. Because the probability for delivery of the product at completion of the 50% chain is significantly legs than 100% probability, a project buffer, PB, or safety interval, must be added at the end of the critical chain. For non-critical components that feed into the schedule, a feeding buffer, FB, is inserted at the point where the non-critical component links into the critical chain. The "padding" in the schedule, then, is located at the end of each component chain rather than distributed throughout all tasks.

One of the major drawbacks that exists with presently available TOC-based systems and methods is the inability to quickly and easily generate, update, interpret and understand buffer charts which are suitable for use by all project members in tracking progress to plan.

In particular, presently available tabular systems and methods do not allow project members, or more importantly project managers the ability to readily visually ascertain at a glance, by reference to a chart or model or graphical illustration, when buffer levels are getting too low, such that action can be taken in order to improve delivery results.

Another drawback that exists is the inability to know the actual status of each project component, and especially one that is critical (in order to apply the TOC methodology of identifying and elevating the critical chain). It is difficult, however, to determine this unless one analyzes the detailed schedule and derives the critical chain from dates cascaded by the presently known tools, such as, for example, a software product known as ProChain.

Consequently, there exists a need to quickly and easily generate and update buffer charts by using, for example, a computer system and method. In addition, there exists a need to quickly and easily visually detect when buffer levels are getting too low, so that appropriate action may be taken by project members. Furthermore, there exists a need to provide management with a simple method which may be used to determine a current critical chain.

SUMMARY OF THE INVENTION

These needs and others are met using a novel approach to Theory of Constraints (TOC) project management. In the known TOC project management approach, schedules contain buffers or "safety intervals" located at the end of non-critical task chains and at the end of the critical chains. Some consumption of these buffers is likely during development, and progress relative to plan is tracked by monitoring these buffer levels. Furthermore, acceptable buffer consumption may be modeled in a number of ways, including as a linear process over time.

The project management approach of the present invention utilizes feeding and project buffer chart construction and interpretation, and includes a graphical method to identify the effect of critical chain components on the overall project. Specifically, buffer consumption over actual project time is plotted such that one may easily and readily determine, by visual reference to the graph, when buffer consumption crosses a visually discernible minimum consumption line and/or an "alarm line" which should trigger some corrective management action.

It should be noted that this approach to TOC buffer graphing, tracking and management can be accomplished by the use of computers. For example, several software packages such as Microsoft Project, ProChain (a TOC scheduler) and Microsoft Excel (as well as various other spreadsheet programs) may be employed to automate the inventive methods and techniques disclosed herein.

BRIEF DESCRIPTION OF THE DRAWINGS

The foregoing and other features and advantages of the present system and method are readily apparent and are to be understood by referring to the following detailed description of the preferred embodiment of the present invention, taken in conjunction with the accompanying drawings, in which:

FIG. 10 is a prior art project status report using a currently available software product.

DETAILED DESCRIPTION OF THE INVENTION

The present invention provides a more realistic model, or models, for buffer consumption which would help drive appropriate behaviors amongst project managers and project team members. In addition, the present invention provides a visual method for showing progress relative to plan that incorporates this model and presents it in a manner that is simple to understand. Furthermore, the present invention provides an approach to easily identify current critical components for all stages of the project.

Figure 2:
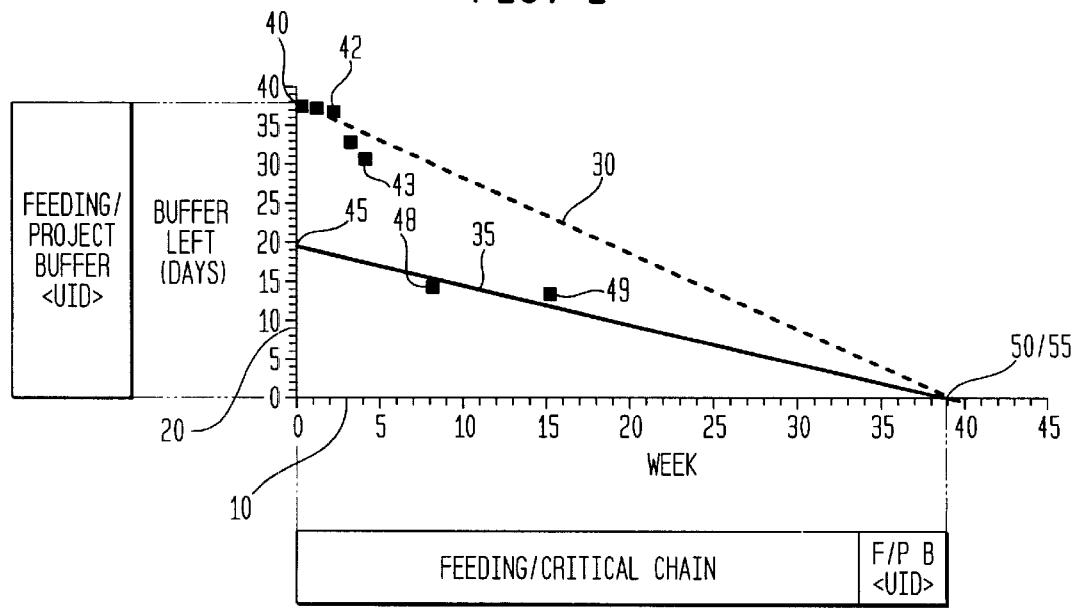
FIG. 2 is a chart illustrating a graphical view of Feeding/Project Buffer Tracking.

In accordance with the present invention, project buffer consumption is modeled as a linear process over time, with management reaction levels set at fractions of the acceptable rate. All models which tend to change over time are part of, and may be utilized within the inventive method and system described herein. One model, used for exemplary purposes herein, is one in which project buffer may be consumed as a linear process over time. One aspect of the inventive concept is to graphically present project buffer consumption so that it may be easily understood when implemented as a readily discernible graph, as illustrated by FIG. 2. The X-axis 10 represents project time (or development interval), and the y-axis 20 represents the amount of buffer remaining. The scale used on the various axes, e.g. days, weeks, months, etc., is a matter of application specific design choice. The person of skill will recognize, however, that the choice of axial scale impacts the readability of the graph to be generated and analyzed, and thus the time values should be chosen in a manner to simplify readability. Such choices should be well within the abilities of the person of skill in the art using the teachings presented herein. Initially, by way of a preferred example, a line 30 which represents a predetermined or presumed minimum acceptable buffer consumption rate, alternately and interchangeably referred to herein as a preferred buffer consumption rate or ideal buffer consumption rate, is drawn on the chart. This rate is generally selected by project management as a function of known project parameters or management experience, or both, or other project-influencing factors known to management and or members of the project team. The y-intercept 40 of this line 30 is the initial buffer size. The x-intercept 50 of the line 30 is the overall planned duration of the project chain plus its buffer. Another line 35 is drawn to represent an alarm level. In this example, we have chosen to set the alarm level at 50% of the minimum acceptable buffer consumption rate, such that the alarm level y-intercept 45 is at 50% of the initial buffer size. The alarm level x-intercept 55 is, again, the overall planned duration of the component chain plus its buffer. Although 50% of the minimum acceptable buffer consumption rate was used as an example, multiple or different alarm levels can be set at any level deemed appropriate or desirable, as a matter of application specific design choice.

As will be discussed further below, feeding buffer charts and project buffer charts may be constructed in the same way. The important difference is that the x-intercept on a feeding buffer defines the delivery of the feeding component to the critical chain. The x-intercept of the project buffer defines the completion of the project, or a sub-delivery within a larger project.

The buffer charts of the present invention provide an effective visual tool for monitoring the amount of buffer left relative to the target level, and alarm level(s). In a preferred embodiment, the following commercially available tools may be utilized in creating the visually discernible buffer charts of the present invention: a) MS Project a software product available from MICROSOFT of Redmond, Wash.; b) ProChain, an add-on software tool to MS Project which implements TOC-based scheduling, i.e. calculates buffer sizes, inserts them in the right places, and calculates the amount of buffer left based on updates from developers, available from Creative Technology Labs LLC of Wallingford, Conn.; and c) Excel, also from MICROSOFT, a spreadsheet program for data tabulation with integrated graphing capability. Of course the person of skill may use software products that contain similar features to the programs mentioned above, as well as write or develop his or her own program or programs, to achieve the functionality described herein.

Figure 11:
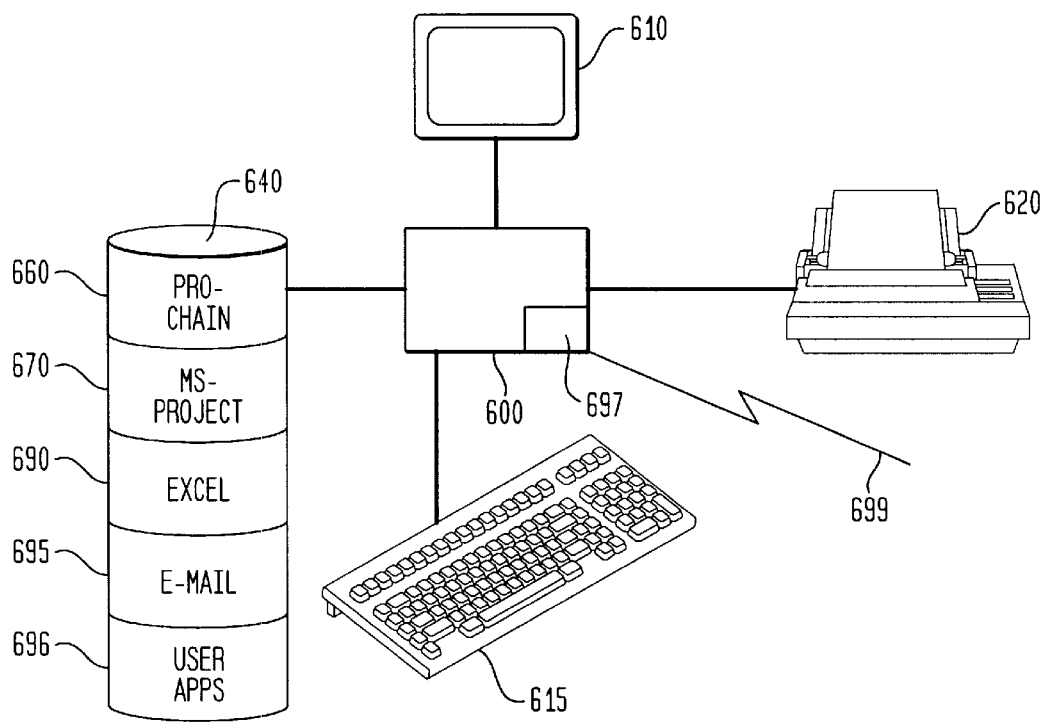
FIG. 11 is a block diagram of a computer system adopted to implement the inventive method.

Thus, and with reference to FIG. 11, the inventive system may be implemented using a general purpose digital computer 600 of a known type, such as for example a personal computer, having software running thereon and stored for example on a disk drive 640 in a known manner. The computer 600 may run MS-Project 670 and the add-on tool Pro-Chain 660 to gather and construct data relative to the individual project tasks being tracked and the available feeding chain data pertinent thereto. The buffer information may be fed to a spreadsheet/graphing package such as Excel 690 or its art recognized equivalent for graphing and display on display device 610 which may be, for example, a CRT display or other known computer display device, and/or the graph may be printed on a hard copy printer 620 of known type. Project status data and software commands may be entered into the system via keyboard 615 or other known input device. Customized user applications 696, which may be developed by a particular user to perform any or all of the functions described herein, may also be utilized to implement some or all of the inventive features of the present invention described herein. A modem 697 and communication line 699 may also be provided for external communication or remote data entry. Computer 600 may also be part of a network of computers (not shown).

Updating of the schedule information is of course necessary, and is performed at predetermined regular intervals as a matter of design choice for the project manager. This information may be obtained from individual task owners in the form of an estimate of the number of days remaining on their current task. In one embodiment of the invention, all developers who are currently working on a scheduled task may email the "interval remaining" schedule information on a weekly basis, over communication line 699 using any known email software package 695, in a manner known in the art. This information is entered into the ProChain application 660, which uses this information to calculate the amount of buffer that remains.

If a feeding task is taking longer than the 50% interval estimate allocated for that task, some of its feeding buffer will be consumed. If a critical chain task is taking longer than the 50% estimate, however, some of the project buffer will be consumed. One way that this data may be transferred to the buffer charts using the system depicted in FIG. 11 is as follows:

a) Update schedule using ProChain 660;
    b) Apply a filter to MS Project/ProChain to obtain a columnar list of time remaining in all buffers in the schedule, as seen in FIG. 10;
    c) Copy that column of numbers into a software buffer (not shown) in computer 600; and d) Paste that column of numbers into a spreadsheet such as Excel 690, wherein the cells of the spreadsheet are used to generate the above- and below- described buffer charts using the known graphing capabilities of the Excel program 690.

An important known TOC principle that accelerates development is the "roadrunner" concept: developers agree to work as fast as is reasonably possible to complete their current tasks, rather than work to a milestone date. Of particular concern is how developers ascertain whether they are working at an adequate pace despite the absence of intermediate milestones. The amount of buffer left for their component, relative to the buffer consumption guidelines, is indicative of whether developers are working at an adequate pace.

For example, referring to FIG. 2, when the buffer level stays above the minimum acceptable buffer consumption line, as indicated by data point 42 the component is being developed at an adequate pace (in fact, if the data points create a horizontal line, it means that all tasks are being completed according to the 50% confidence interval estimates.) If points begin to fall below the minimum line, as indicated by data point 43, individual developers need to seek solutions that speed up development and prevent the buffer from nearing the alarm level. These vary depending on the situation, but could be to focus on removing roadblocks to progress, or to request an additional short-term resource on the task. If the buffer level nears and/or falls below the alarm level line 35, as indicated by data point 48, more extensive action is required of management. Tasks might be restructured, or reassigned, or additional resources (personnel or money) might be applied. The result of a successful action is that the buffer level increases above the minimum line, as indicated for example by data point 49.

Thus it can be seen by observing FIG. 2 that a readily perceptible and recognizable management tool is provided by the present invention, for by providing a means to readily graphically depict project progress, project managers can obtain direct and valuable project status information "at a glance" by simply observing where the last (i.e. most recent) project or feeding chain buffer consumption data point falls with respect to the minimum acceptable buffer consumption line and/or the predetermined alarm line.

Of course it will be recognized that a low project buffer level more directly predicts that a project is likely to miss its scheduled deadline. In fact, if the project buffer goes to zero, critical chain tasks must from then on be completed according to their 50% intervals in order for the delivery to be made on time. This situation is avoided by focused monitoring of, and reaction to, project buffer levels. Buffer levels should be kept above minimum levels if at all possible. TOC principles of subordination to the critical chain, and elevation of the critical chain, need to be rigorously applied to maintain this situation. "Subordination" means that non-critical chain members of the team support critical chain members in any way possible to expedite development. "Elevation" means that additional methods to improve the throughput (or development rate) of the critical chain tasks are applied.

Figure 12:
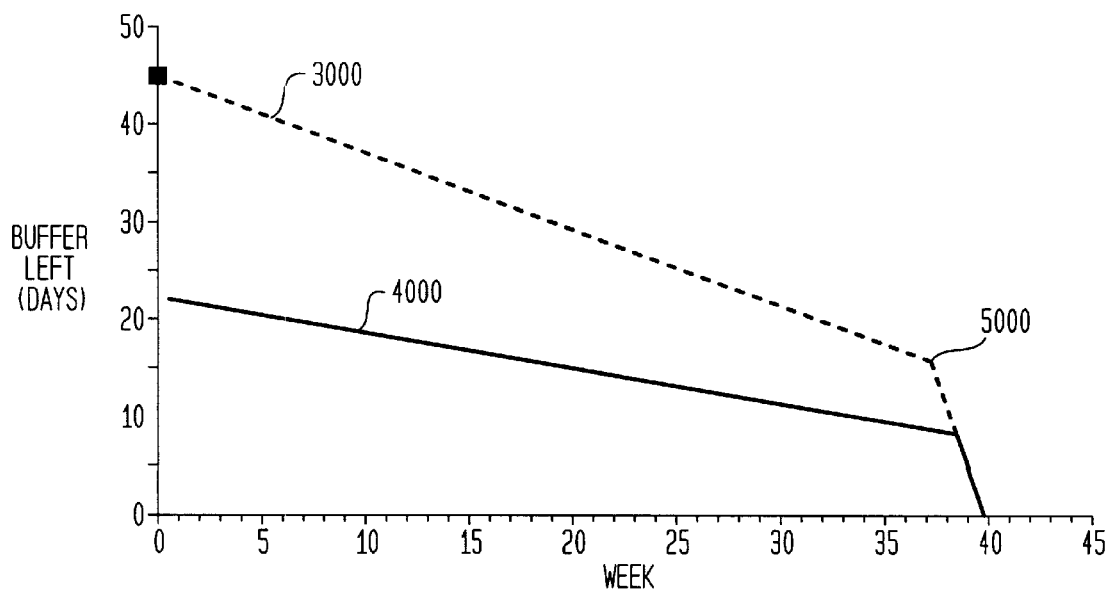
FIG. 12 is a chart depicting an alternate buffer consumption model.

It should be recognized that any model that considers buffer consumption levels and alarm levels that change over time is a part of this invention. One model is that project or feeding buffer may be consumed as a linear process over time, as shown in the examples heretofore presented. Another is that buffer may be consumed at a linear rate but at a differing slope than that described above, but one which leaves some buffer left at the end to account for unexpected events near the end of the chain. Such a model is depicted, by way of non-limiting example, in FIG. 12, where line 3000 is a preferred consumption line and line 4000 is an alarm line, each progressing at a linear rate but leaving a larger amount of buffer at project end, as seen in the region of knee 5000 in curve 3000. Other models may employ consumption functions other than linear, for example, logarithmic, parabolic, poly-linear, etc., as a matter of application specific design choice. The graphing of such models is well within the skill of the routineer in the art using the techniques taught herein as well as those graphing techniques known in the art.

Figure 1:
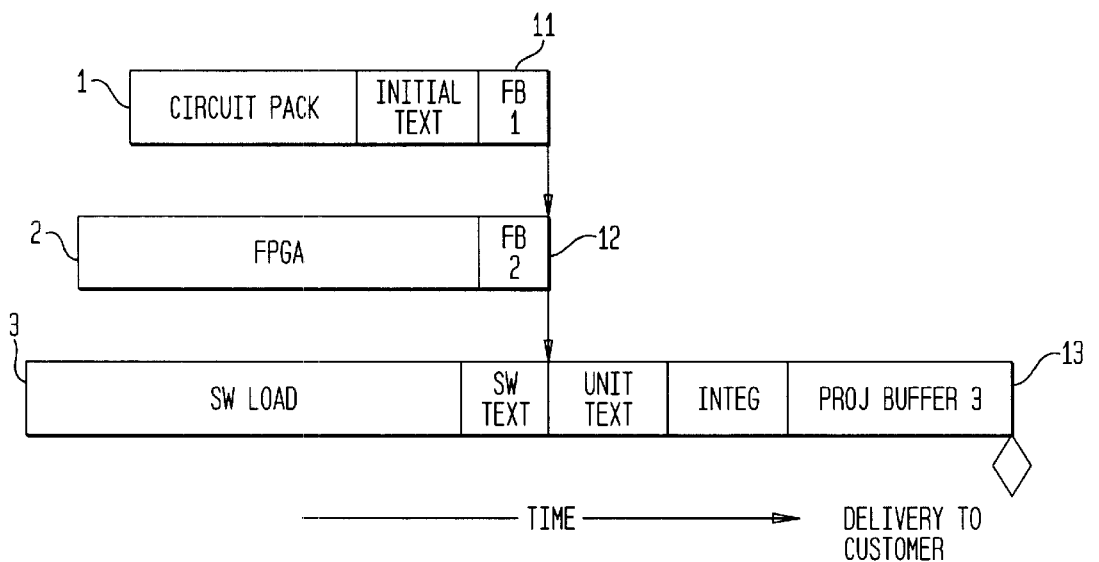
FIG. 1 is an illustrative chain diagram of an exemplary TOC-based Product Development Schedule.

During a project managed in accordance with TOC techniques, it is possible that feeding buffers could drop to zero, or even "below" zero, due to problems encountered during development. Thus in an exemplary project, such as depicted in FIG. 1, where a first feeding chain 1 with feeding buffer 11, and a second feeding chain 2 with feeding buffer 12, both feed a critical chain 3 with project buffer 13, it is possible that a feeding component can actually become the critical chain. FIGS. 3–7 and the following discussion describe how the present invention may be utilized for easy identification of the current critical component.

Figure 3:
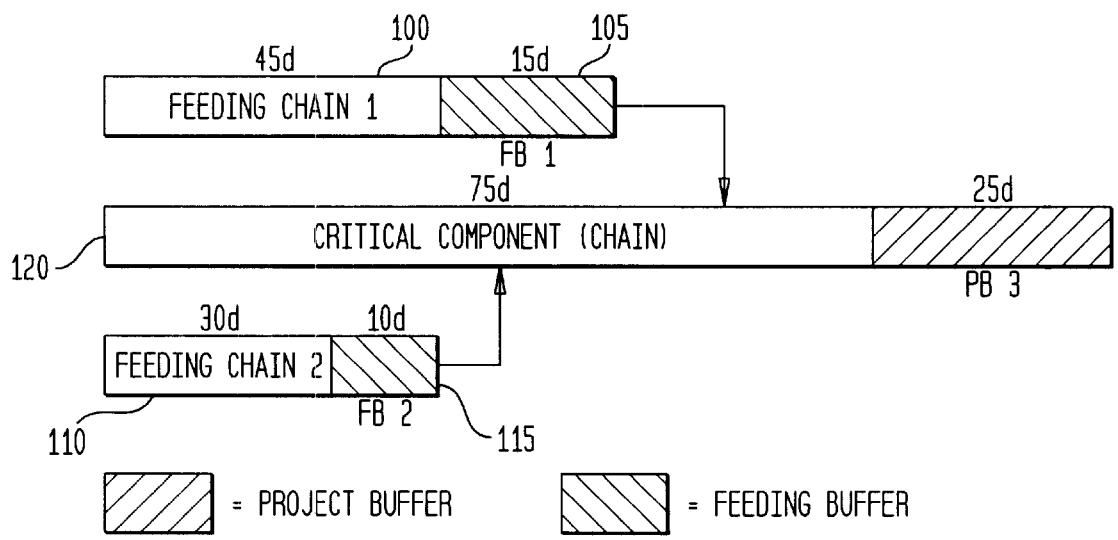
FIG. 3 is a chain diagram illustrating a hypothetical project shown at the start of the project.
Figure 4:
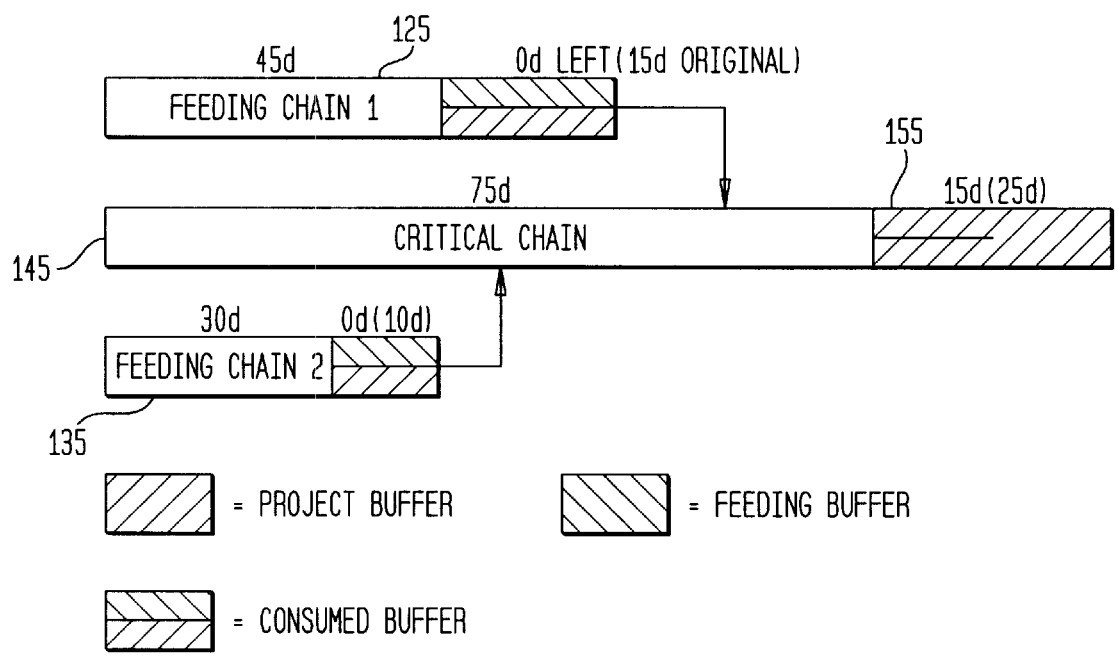
FIG. 4 is the FIG. 3 chain diagram illustrating the same hypothetical project after seven (7) weeks of development.
Figure 5:
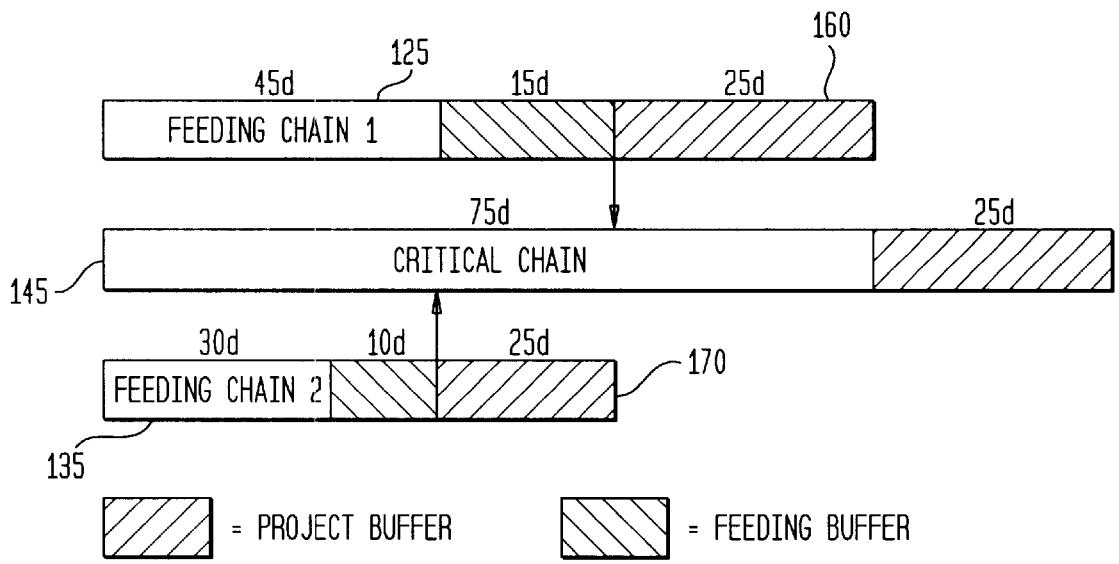
FIG. 5 is a chain diagram illustrating an Extended Feeding Buffer.

Referring now to FIG. 3, there is shown a representation of the chains of a hypothetical project. Feeding Chains 1 (100) and 2 (110) are fed into the Critical Component (Chain) 120. Feeding Chain 1 (100) has a 15 day feeding buffer 105 and Feeding Chain 2 (110) has a 10 day feeding buffer 115. As the project progresses, it is possible that a non-critical component can slip to an extent that its feeding buffer is totally consumed. Such is shown in FIG. 4. In FIG. 4 the project is illustrated after 7 weeks, and both the feeding buffers are totally consumed, but the components are not yet finished. After a component's feeding buffer is totally consumed, the feeding chain starts consuming project buffer. As shown in FIG. 4, the 2 feeding components, Feeding Chain 1 (125) and Feeding Chain 2 (135), are consuming project buffer 155, but the critical component 140 is not. The amount of project buffer left always represents the worst case consumption of all feeding chains and the critical chain. If the feeding component has slipped more than the original critical component, the feeding component has become critical. It is important to know the actual status of each component, and especially which one is critical, in order to apply the TOC methodology of subordinating to and elevating the critical chain.

Figure 6:
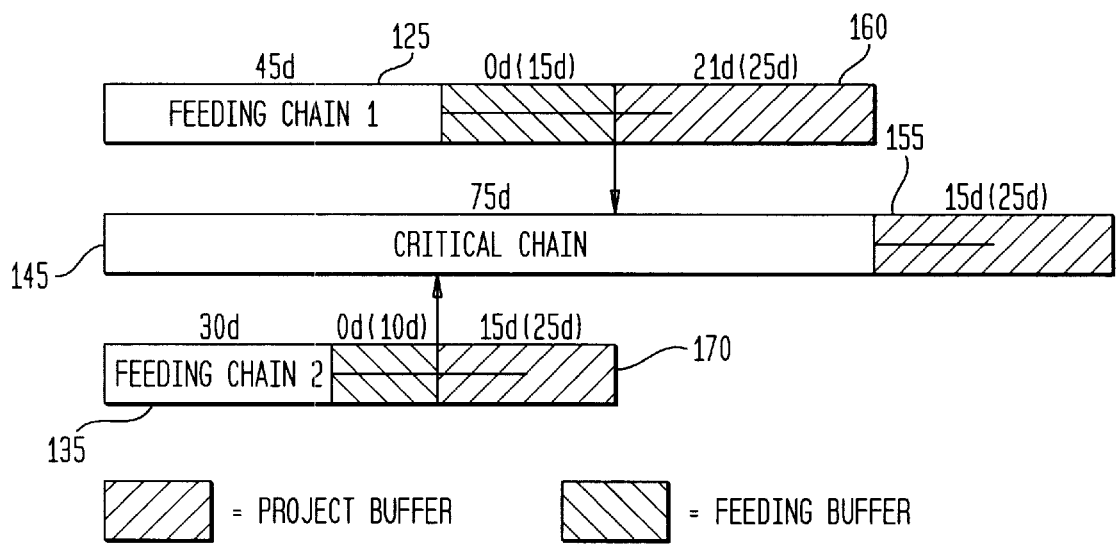
FIG. 6 is the FIG. 5 chain diagram illustrating the same Extended Feeding Buffer after seven (7) weeks.

In order to give management a simple method to determine the current critical chain, an "Extended Feeding Buffer" is utilized. Feeding buffers are extended by adding an interval which is equal to the project buffer. Such an extension is readily accommodated in project management software, such as for example ProChain 660 (FIG. 11). This is represented schematically in FIG. 5 in connection with critical chain 145. Interval 160 and interval 170, each one being equal to the project buffer 155 length of 25 days, have been added to the feeding chains. As shown in FIG. 6, with extended feeding buffers you can easily see the effect of the feeding chain on the project buffer. The figure shows that feeding chain 2 (135) is consuming the most project buffer, 10 days.

Figure 7:
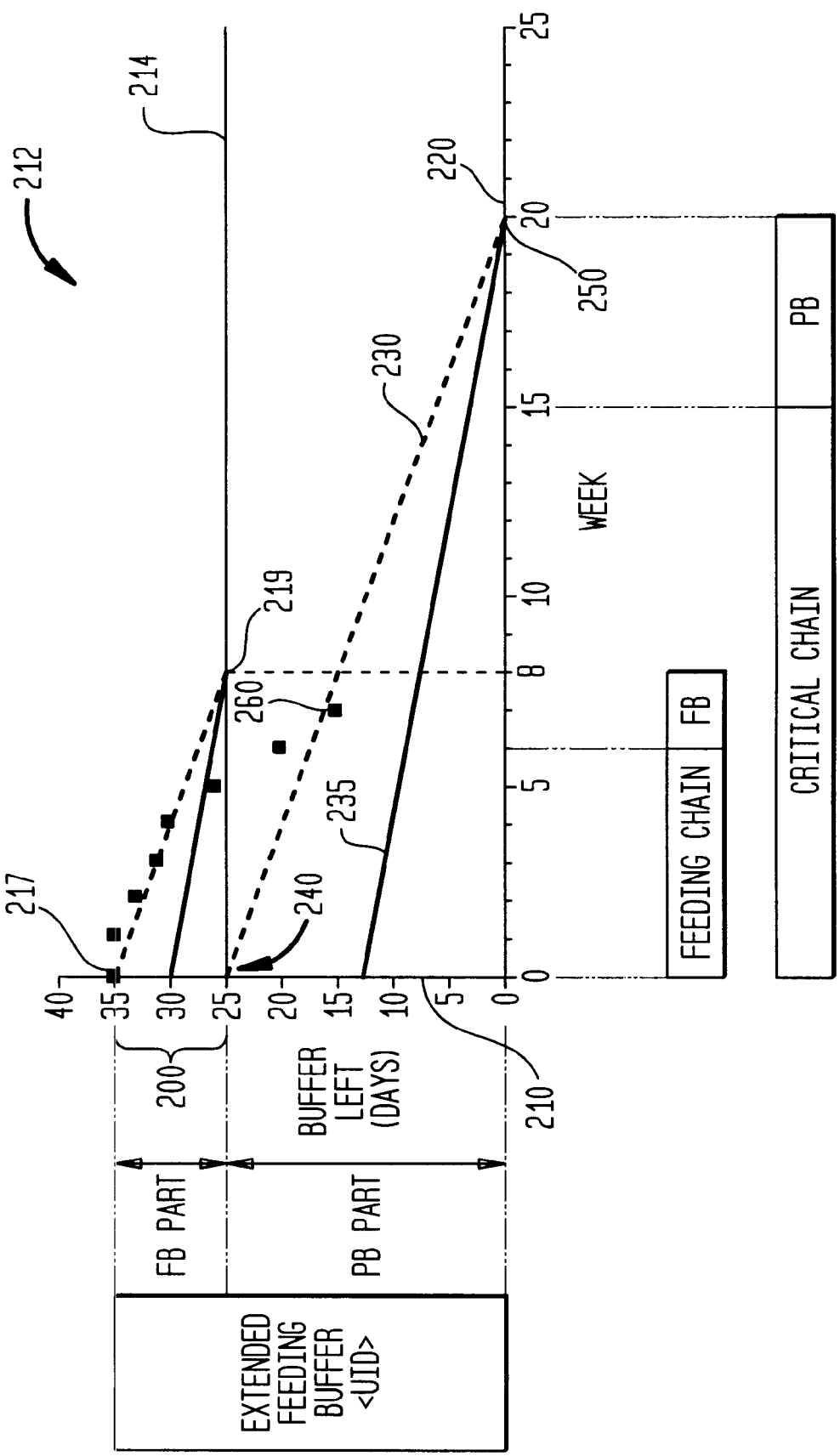
FIG. 7 is a chart illustrating a graphical view of Extended Feeding Buffer Tracking.

FIG. 7 shows the graphical construction of an Extended Feeding Buffer Chart. The top portion of the chart is the feeding buffer 20, represented in accordance with the present invention as described above. In this embodiment, to facilitate rapid, "at a glance" management review of the impact of a feeding chain on the project buffer, a tracking chart is constructed with an upper portion 212 representing a feeding chain tracking chart having an x-axis 214 that extends from point 240, which is the point represented on the y-axis that indicates the size of the project buffer (in this example 25 days) along y-axis 210. The size of feeding buffer 200 (in this example 10 days), is plotted on y-axis 210 beginning at point 240. Point 217 thus becomes the point from which the minimum feeding buffer is drawn, to point 219, which represents the point on the x-axis 220 that defines the completion of the feeding chain, (in this example week 8). The project buffer is placed below the feeding buffer. The y-axis 210 represents the total of the two buffers. Minimum and alarm levels are drawn for both buffers. The x-axis 220 represents the amount of actual project time expended (chain size and buffer size). A line 230 which represents the minimum buffer consumption rate is drawn on the chart. The y-intercept 240 of the line 230 is the initial buffer size. The x-intercept 250 of the line 230 is the overall planned duration of the component chain plus its buffer. The data point 260 in FIG. 7 illustrates a situation in which the feeding buffer has been consumed much too early, and in fact this feeding component chain as shown begins to consume project buffer.

Figure 8:
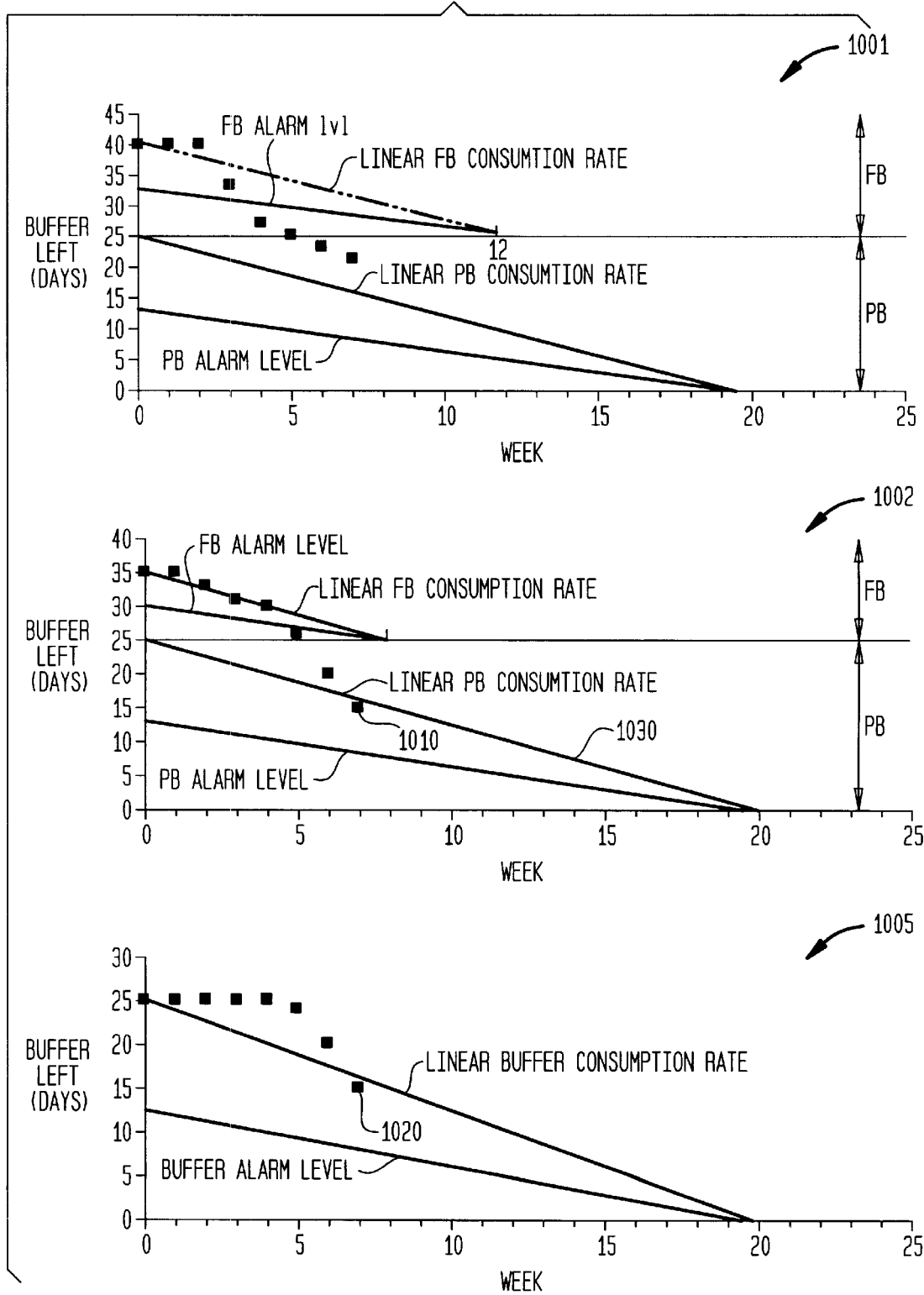
FIG. 8 is a chart illustrating a complete set of buffer charts for the hypothetical project.

FIG. 8 shows a preferred implementation of the concept of using extended feeding buffers to identify the current critical component. The top two charts, chart 1001 and 1002, are extended feeding buffer charts depicting the tracking of buffer consumption for two feeding chains for task 1 (chart 1001) and task 2 (chart 1002). In accordance with the present invention, when a feeding buffer has been consumed, the data points on the chart drop down into the region of project buffer consumption. Comparing the buffer consumptions depicted in Extended Feeding Buffer Charts 1001, 1002, with the Project Buffer Chart 1005 allows ready identification of the critical project component at a glance, in this case task 2, since it can be seen from data point 1010 that task 2 is now consuming project buffer. The extended feeding buffer concept of the present invention allows rapid determination of which task is actually consuming project buffer, since by seeing a data point 1020 on the project buffer chart 1005, a project manager may, by then reviewing the extended feeding buffer charts of the various tasks feeding the project, rapidly determine that the critical chain is in fact task 2, since data point 1010 is below the consumption rate line 1030. Because the representation is graphical rather than analytical, understanding the situation is more intuitive than via a date-based analysis of the schedule. It is also simple to see the actual status of each component because the criticality of the feeding chain is not obscured.

As earlier explained, the buffer chart is meant to permit ready visualization of buffer consumption, the impact of feeding chains on the project buffer, and trends in buffer consumption.

An additional visual tool which may be added to the above described buffer charts is what is termed the Chain Completion Line. (CCL). This line is derived as follows. First, a point is identified at which the linear buffer consumption line crosses the X-axis. Next, a point is identified at the data point that represents the point in time that the project would end if there was no buffer consumption at all, in other words, the point at 50% chain length with 100% buffer left. Drawing a straight line through those two points yields the CCL. The CCL reflects for each project time interval it's final data point, that is when a data point is on the CCL that specific chain is completed.

The CCL can be used for a number of purposes, such as, for example, prediction of the remaining project duration based upon buffer consumption trends. This can only be done when historical information is available, as buffer consumption in a linear mode is rarely if ever the actual mode of consumption. The CCL may also be used when a project is facing a delivery delay. The CCL can be used to determine the new delivery data point. In this way both the linear buffer consumption line and the alarm level line can be adapted according to this new data point. An example of the CCL is illustrated in FIG. 9.

Figure 9:
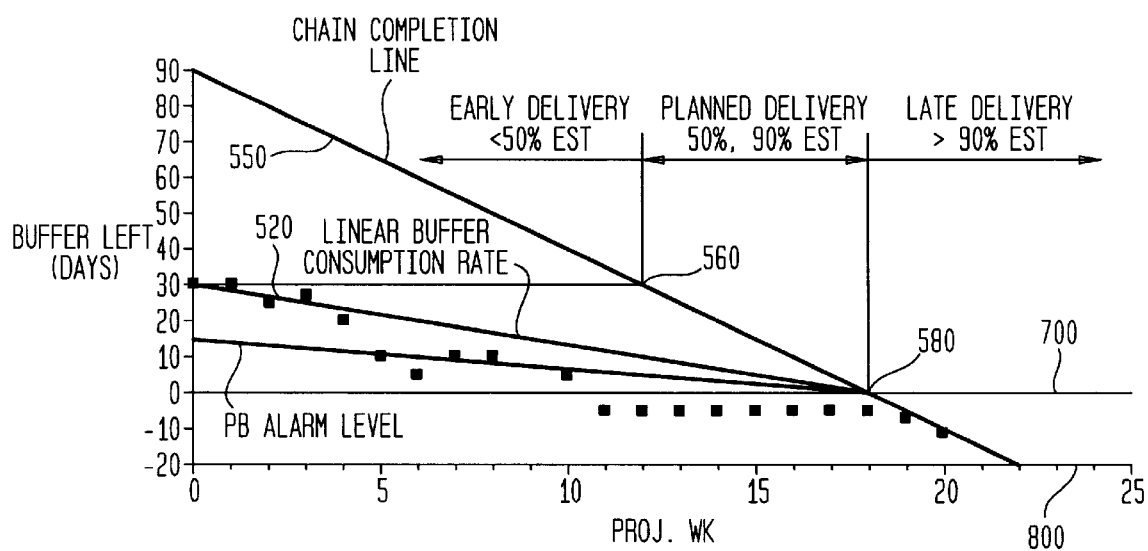
FIG. 9 is a chart illustrating the use of the Chain Completion Line for a hypothetical project.

Specifically, as seen in FIG. 9, a data point 560 is identified at the point of project completion with no buffer consumption. A point 580 is also identified where the linear buffer consumption line 520 crosses the X-axis 700. A straight line connecting, and extending beyond points 560 and 580 is the Chain Completion Line (CCL) 550. It can thus be seen that the project data points will always lie to the left of the CCL, and for those points below the original X-axis 700, one can derive a new expected completion estimate from the point at which the CCL 550 crosses a second axis X', denoted by the numeral 800.

The above discussion demonstrates a simple model for TOC buffer consumption that can be implemented in a graphical format using existing, commercially available tools. These buffer charts are easy to generate, update and understand, and are suitable for use by all project members in tracking progress to plan.

While the disclosed Theory of Constraints buffer graphing, tracking and management method and system is particularly shown and described herein with reference to the preferred embodiments, it is to be understood that various modifications in form and detail may be made therein without departing from the spirit and scope of the present invention. Accordingly, modifications, such as any examples suggested herein, but not limited thereto, are to be considered within the scope of the present invention. Thus one skilled in the art may modify the particular buffer consumption rates and alarm rates based on the needs of a particular project, as a matter of design choice. Also, the confidence intervals chosen need not be 50% and 90%, but may also vary as an application specific matter of design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of graphically depicting the progress of a project being managed in accordance with Theory of Constraints (TOC) project management techniques, said method comprising the steps of:

creating a visually perceptible project buffer tracking chart as a graph by;
(a) extending a first graph axis along an x-axis having measured thereon time units representative of time consumed by said project;
(b) extending a second graph axis perpendicular to said first axis along a y-axis having measured thereon time units representative of project buffer time available within said project; and
(c) plotting at a buffer consumption data point an actual buffer time consumption amount as a function of an actual project time consumption amount so as to enable determination of a necessity for corrective action by a project manager based upon the location of said data point on said graph.

2. The method of claim 1, wherein said method further comprises:
   plotting on said graph a buffer consumption rate line representative of a preferred buffer consumption rate during the duration of said project so that said determination enabled in said step (c) may be made as a further function of said location of said data point relative to said buffer consumption rate line.

3. The method of claim 1, wherein said method further comprises:
   plotting on said graph an alarm line representative of an alarm limit below which said amount of buffer time available should not fall so that said determination enabled in said step (c) may be made as a further function of said location of said data point relative to said alarm line.

4. The method of claim 2, wherein said method further comprises:
   plotting on said graph an alarm line representative of an alarm limit below which said amount of buffer time available should not fall so that said determination enabled in said step (c) may be made as a further function of said location of said data point relative to said alarm line and said buffer consumption rate line.

5. The method of claim 1, further comprising the steps of:
   plotting a visually perceptible feeding buffer tracking chart of a feeding chain to be tracked on said project buffer tracking chart by;
   (i) extending a third axis parallel to said x-axis from a project buffer amount point on said y-axis equal to the total project buffer time available at a beginning of said project; and
   (ii) extending said y-axis from said project buffer amount point by an amount equal to or greater than a feeding chain buffer size of said feeding chain to be tracked so as to create a feeding buffer tracking chart portion located above said project buffer tracking
   (iii) plotting at a feeding buffer consumption data point an actual feeding buffer time consumption amount as a function of an actual project time consumption amount so as to enable further determination of a necessity for corrective action based upon the location of said feeding buffer consumption data point on said graph.

6. The method according to claim 1, further comprising the steps of:
   identifying a data point on said graph corresponding to the duration of said project when no amount of project buffer is consumed;
   identifying a point on said graph corresponding to the expected actual duration of said project; and
   extending a straight line between and through said points to create a chain completion line which indicates, in a region bounded by said chain completion line and said axes, the portion of said graph within which all possible project completion times lie.

7. A method of graphically depicting the progress of a project being managed in accordance with Theory of Constraints (TOC) project management techniques, said method comprising the steps of:
   creating a project buffer tracking chart as a graph by;
   (a) extending a first graph axis along an x-axis having measured thereon time units representative of time consumed by said project;
   (b) extending a second graph axis perpendicular to said first axis along a y-axis having measured thereon time units representative of project buffer time available within said project; and
   (c) plotting at a buffer consumption data point an actual buffer time consumption amount as a function of an actual project time consumption amount so as to enable determination of a necessity of a selected action by a project manager based upon the location of said data point on said graph.

8. The method of claim 7, further comprising the steps of:
   plotting a visually perceptible feeding buffer tracking chart of a feeding chain to be tracked on said project buffer tracking chart by;
   (i) extending a third axis parallel to said x-axis from a project buffer amount point on said y-axis equal to the total project buffer time available at a beginning of said project; and
   (ii) extending said y-axis from said project buffer amount point by an amount equal to or greater than a feeding chain buffer size of said feeding chain to be tracked so as to create a feeding buffer tracking chart portion located above said project buffer tracking
   (iii) plotting at a feeding buffer consumption data point an actual feeding buffer time consumption amount as a function of an actual project time consumption amount so as to enable further determination of a necessity for corrective action based upon the location of said feeding buffer consumption data point on said graph.

9. A system for tracking the progress of progress of a project being managed in accordance with Theory of Constraints (TOC) project management techniques comprising:
   a general purpose computer having software capable of receiving data related to the status of said project, said software using said data to creating a project buffer tracking chart as a graph by;
   (a) extending a first graph axis along an x-axis having measured thereon time units representative of time consumed by said project;
   (b) extending a second graph axis perpendicular to said first axis along a y-axis having measured thereon time units representative of project buffer time available within said project;
   (c) plotting at a buffer consumption data point an actual buffer time consumption amount as a function of an actual project time consumption amount as derived from said status data so as to enable determination of a necessity for corrective project management action based upon the location of said data point on said graph; and
   an output device connected to said computer for generating a visibly perceptible image of said graph.

10. The system of claim 9, wherein said software further comprises the capability of plotting a feeding buffer tracking tart of a feeding chain to be tracked on said project buffer tracking chart graph by;
   (i) extending a third axis parallel to said x-axis from a project buffer amount point on said y-axis equal to the total project buffer time available at a beginning of said project; and
   (ii) extending said y-axis from said project buffer amount point by an amount equal to or greater than a feeding chain buffer size of said feeding chain to be tracked so as to create a feeding buffer tracking chart portion located above said project buffer tracking
   (iii) plotting at a feeding buffer consumption data point an actual feeding buffer time consumption amount as a function of an actual project time consumption amount based on said status data so as to enable further determination of a necessity for corrective action based upon the location of said feeding buffer consumption data point on said graph.

11. The system of claim 9, wherein said software further comprises the capability of identifying a data point on said graph corresponding to the duration of said project when no amount of project buffer is consumed;

identifying a point on said graph corresponding to the expected actual duration of said project; and extending a straight line between and through said points to create a chain completion line which indicates, in a region bounded by said chain completion line and said axes, the portion of said graph within which all possible project completion times lie.

12. A method of tracking the progress of a project being managed in accordance with Theory of Constraints (TOC) project management techniques, said method comprising the steps of:

(a) determining a minimum rate of project buffer consumption;

(b) determining an actual rate of project buffer consumption;

(c) creating a graphical depiction of said minimum rate versus said actual rate in visibly perceptible form;

(d) comparing said actual rate to said minimum; and (e) determining whether to perform a corrective project activity based upon said comparison performed in step (d).

* * * * *